(12) United States Patent
Joshi et al.

(10) Patent No.: US 9,746,997 B2
(45) Date of Patent: Aug. 29, 2017

(54) SHARE TIMELINE OF CALENDAR

(71) Applicant: Microsoft Technology Licensing, LLC, Redmond, WA (US)

(72) Inventors: Neel Joshi, Bellevue, WA (US); Jeannine Boone, Seattle, WA (US); Joan Li, Seattle, WA (US); Montine Rummel, Kirkland, WA (US); Johanna Hawkins, Redmond, WA (US); Mark Healy, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/519,089

(22) Filed: Oct. 20, 2014

(65) Prior Publication Data

US 2015/0372829 A1   Dec. 24, 2015

Related U.S. Application Data (60) Provisional application No. 62/015,350, filed on Jun. 20, 2014.

(51) Int. Cl.
*G06F 15/16* (2006.01)
*G06F 3/0482* (2013.01)
(Continued)

(52) U.S. Cl.
CPC .......... *G06F 3/0482* (2013.01); *G06F 3/0485* (2013.01); *G06F 3/0486* (2013.01);
(Continued)

(58) Field of Classification Search
CPC .. G06Q 10/109; G06Q 10/1093; G06Q 10/10; G06Q 10/06311; G06Q 10/1097; G06F 3/0482; H04L 51/38; H04L 67/1095; H04L 67/02; H04L 41/06; H04L 51/046; H04L 67/2842; H04L 51/22; H04L 67/04; H04L 67/2852; H04L 12/5895; H04L 2209/80; H04L 29/06; H04L 41/0803; H04L 41/22; H04L 49/90; H04L 51/16; H04L 51/24; H04L 51/28; H04L 5/0048; H04L 63/0876; H04L 63/101; H04L 63/108; H04L 67/08; H04L 67/10;
(Continued)

(56) References Cited

U.S. PATENT DOCUMENTS 5,649,182 A   7/1997 Reitz
5,745,110 A   4/1998 Ertemalp
(Continued)

OTHER PUBLICATIONS

W3C; Performance Timeline W3C Proposed Recommendation Oct. 31, 2013; 2013; pp. 1-6.*
(Continued)

*Primary Examiner* — John Macilwinen
(74) *Attorney, Agent, or Firm* — Turk IP Law, LLC (57) ABSTRACT

Sharing a timeline of a calendar is provided. An application such as a calendar application detects an activation of a share operations control on a timeline of a calendar. A context menu is displayed on the timeline, where the context menu includes a share control and a print control. An activation of the share control is detected. A communication component is initiated to share the timeline.

18 Claims, 7 Drawing Sheets

(51) Int. Cl.
*G06F 3/0484* (2013.01)
*G06F 3/0485* (2013.01)
*H04L 29/08* (2006.01)
*G06Q 10/10* (2012.01)
*G06F 3/0486* (2013.01)
*G06F 3/0488* (2013.01)
*G06F 17/30* (2006.01)
*H04L 12/18* (2006.01)
*H04L 12/58* (2006.01)

(52) U.S. Cl.
CPC ...... *G06F 3/04842* (2013.01); *G06F 3/04847* (2013.01); *G06F 3/04855* (2013.01); *G06F 3/04883* (2013.01); *G06F 17/30867* (2013.01); *G06F 17/30964* (2013.01); *G06Q 10/109* (2013.01); *G06Q 10/1093* (2013.01); *H04L 12/1813* (2013.01); *H04L 51/08* (2013.01); *H04L 67/02* (2013.01)

(58) Field of Classification Search
CPC ......... H04L 67/14; H04L 67/16; H04L 67/18; H04L 67/24; H04L 67/26; H04L 67/2804; H04L 67/2823; H04L 67/2861; H04L 67/34; H04L 67/42; H04L 69/08; H04L 69/329
USPC ............... 709/204, 227, 245, 246, 206, 248; 705/7.17, 7.18, 7.21, 963
See application file for complete search history.

(56) References Cited

U.S. PATENT DOCUMENTS

| | | | |
|---|---|---|---|
| 5,898,431 A | 4/1999 | Webster et al. | |
| 6,360,217 B1 | 3/2002 | Gopal et al. | |
| 6,603,489 B1 | 8/2003 | Edlund et al. | |
| 6,678,698 B2 | 1/2004 | Fredell et al. | |
| 7,149,810 B1 | 12/2006 | Miller et al. | |
| 7,349,920 B1 | 3/2008 | Feinberg et al. | |
| 7,502,798 B2 | 3/2009 | Trowbridge et al. | |
| 7,673,248 B2 | 3/2010 | Narayanaswami | |
| 7,870,194 B2 | 1/2011 | Michel et al. | |
| 7,921,026 B2 | 4/2011 | O'Cull et al. | |
| 7,933,955 B2* | 4/2011 | Khalatian | G06F 3/038 709/203 |
| 8,005,906 B2 | 8/2011 | Hayashi et al. | |
| 8,122,362 B2 | 2/2012 | Brush et al. | |
| 8,359,538 B2 | 1/2013 | Jyrinki | |
| 8,407,075 B2 | 3/2013 | Lance et al. | |
| 8,423,088 B2 | 4/2013 | Ickman et al. | |
| 8,577,959 B2 | 11/2013 | Pandey et al. | |
| 8,712,820 B2 | 4/2014 | Gingras et al. | |
| 8,745,141 B2 | 6/2014 | Rosenberg et al. | |
| 8,793,611 B2 | 7/2014 | Van Os | |
| 9,292,521 B1* | 3/2016 | Goo | G06F 17/30073 |
| 2002/0196280 A1* | 12/2002 | Bassett | G06Q 10/109 715/751 |
| 2003/0225732 A1 | 12/2003 | Chan et al. | |
| 2004/0181425 A1 | 9/2004 | Schwerin-Wenzel et al. | |
| 2004/0268270 A1 | 12/2004 | Hill et al. | |
| 2005/0105374 A1 | 5/2005 | Finke-Anlauff et al. | |
| 2005/0108253 A1 | 5/2005 | Metsatahti et al. | |
| 2005/0222971 A1 | 10/2005 | Cary | |
| 2005/0262450 A1 | 11/2005 | Sauermann | |
| 2005/0267975 A1* | 12/2005 | Qureshi | H04L 12/581 709/229 |
| 2006/0020889 A1 | 1/2006 | Coppinger et al. | |
| 2006/0028917 A1 | 2/2006 | Wigginton | |
| 2006/0200372 A1 | 9/2006 | O'Cull et al. | |
| 2006/0236269 A1 | 10/2006 | Borna | |
| 2006/0265263 A1 | 11/2006 | Burns | |
| 2007/0027938 A1* | 2/2007 | Clarke | G06F 17/30368 |
| 2007/0038494 A1 | 2/2007 | Kreitzberg et al. | |
| 2007/0209019 A1 | 9/2007 | Kaval et al. | |
| 2007/0283247 A1* | 12/2007 | Brenneman | G06F 17/30905 715/234 |
| 2008/0034047 A1 | 2/2008 | Rosenberg et al. | |
| 2008/0082925 A1 | 4/2008 | Brush et al. | |
| 2008/0109718 A1 | 5/2008 | Narayanaswami | |
| 2008/0134041 A1 | 6/2008 | Zinn | |
| 2008/0141145 A1 | 6/2008 | Klausmeier | |
| 2008/0168050 A1* | 7/2008 | Reyes | G06F 3/038 |
| 2008/0195452 A1 | 8/2008 | Ponce de Leon | |
| 2008/0195455 A1 | 8/2008 | May et al. | |
| 2008/0235072 A1 | 9/2008 | Gupta et al. | |
| 2008/0294994 A1* | 11/2008 | Kruger | G06Q 10/109 715/733 |
| 2009/0100347 A1 | 4/2009 | Schemers et al. | |
| 2009/0157513 A1* | 6/2009 | Bonev | G06F 17/30029 705/14.69 |
| 2009/0196123 A1* | 8/2009 | Gautam | G06Q 10/109 368/52 |
| 2009/0240611 A1 | 9/2009 | Augustine et al. | |
| 2009/0241048 A1 | 9/2009 | Augustine et al. | |
| 2009/0281859 A1 | 11/2009 | Isaacson | |
| 2010/0223089 A1* | 9/2010 | Godfrey | G06Q 10/109 705/7.19 |
| 2010/0262926 A1 | 10/2010 | Gupta et al. | |
| 2010/0313151 A1 | 12/2010 | Wei et al. | |
| 2011/0071878 A1* | 3/2011 | Gingras | G06Q 10/109 705/7.18 |
| 2011/0126150 A1 | 5/2011 | Haynes et al. | |
| 2011/0167369 A1 | 7/2011 | Van Os | |
| 2011/0202879 A1 | 8/2011 | Stovicek et al. | |
| 2011/0252351 A1 | 10/2011 | Sikora et al. | |
| 2011/0283224 A1 | 11/2011 | Ramsey et al. | |
| 2011/0296312 A1 | 12/2011 | Boyer et al. | |
| 2012/0005261 A1 | 1/2012 | Pandey et al. | |
| 2012/0331378 A1 | 12/2012 | Baioura | |
| 2013/0007648 A1 | 1/2013 | Gamon et al. | |
| 2013/0010575 A1 | 1/2013 | He et al. | |
| 2013/0159198 A1 | 6/2013 | Cartan et al. | |
| 2014/0012574 A1 | 1/2014 | Pasupalak et al. | |
| 2014/0101189 A1 | 4/2014 | Schenkel | |
| 2014/0104158 A1 | 4/2014 | Abdukalykov et al. | |
| 2014/0105492 A1 | 4/2014 | Das et al. | |
| 2014/0108333 A1 | 4/2014 | Jain et al. | |
| 2014/0156597 A1 | 6/2014 | Hakami et al. | |
| 2014/0157200 A1* | 6/2014 | Jeon | G06F 3/0482 715/834 |
| 2014/0281967 A1 | 9/2014 | Bodnick et al. | |
| 2014/0310045 A1 | 10/2014 | Meltzer et al. | |
| 2014/0343990 A1* | 11/2014 | Photowat | G06Q 10/1097 705/7.17 |
| 2015/0178260 A1* | 6/2015 | Brunson | G06F 17/241 715/202 |
| 2015/0302531 A1* | 10/2015 | Thier | G06Q 40/12 705/30 |

OTHER PUBLICATIONS

Price, D. Macworld.com. "iOS 7 Safari tips: How to access iOS 7's new web features". Oct. 2013. pp. 1-7.*
Ocull, Heather., "Timelines Everywhere: See and share your work with ease in SharePoint and PWA", Published on: Sep. 7, 2012 Available at: http://blogs.office.com/2012/09/07/timelines-everywhere-see-and-share-your-work-with-ease-in-sharepoint-and-pwa/.
Batrinca, et al., "A Timeline Visualization for Multi-Team Collaborative Planning", In Proceedings of Extended Abstracts on Human Factors in Computing Systems, Apr. 27, 2013, 6 pages.
"International Search Report and Written Opinion Issued in PCT Application No. PCT/US2015/036569", Mailed Date: Oct. 8, 2015, 9 Pages.
"Second Written Opinion Issued in PCT Application No. PCT/US2015/036569", Mailed Date : Jun. 1, 2016, 5 Pages.
"International Preliminary Report on Patentability Issued in PCT Application No. PCT/US2015/036569", Mailed Date: Oct. 6, 2016, 6 Pages.
"Full Calendar: Animate an event", Chammam, T., published on: Apr. 13, 2013, available at: http://stackoverflow.com/questions/15877417/full-calendar-animate-an-event, 8 Pages.

(56) References Cited

OTHER PUBLICATIONS

"Welcome to dhtmlxScheduler", published on Feb. 23, 2014, available at: http://web.archive.org/web/20140223134212/http://docs.dhtmlx.com/scheduler, 1 Page.
"Scheduler GUI", published on Feb. 25, 2014, available at: http://web.archive.org/web/20140225044235/http://docs.dhtmlx.com/scheduler/user_interface.html, 3 Pages.
"DHTMLX Scheduler .NET Documentation", published on May 9, 2014, available at: http://web.archive.org/web/20140509202129/http://scheduler-net.com/docs/, 3 Pages.
"Non-Final Office Action Issued in U.S. Appl. No. 14/518,664", Mailed Date: Feb. 3, 2017, 20 Pages.
"A Mashup using Google Calendar and Timeline", Retrieved from <<<<https://web.archive.org/web/20081231195709/http://campbell-lange.net/company/articles/googlemashup/>>, Retrieved Date: Dec. 31, 2008, 2 Pages.
"Aeon Timeline", Retrieved from <<https://web.archive.org/web/20120610020235/http://www.scribblecode.com/release_support/AeonTimeline_UserManual.pdf>>, Retrieved Date: Jun. 10, 2012, 64 Pages.
"Calendar with Key Dates", Retrieved from <<https://web.archive.org/web/20120907090930/http://www.spreadsheetshoppe.com/calendar-key-dates—notes-at-bottom.html>>, Retrieved Date: Sep. 7, 2012, 3 Pages.
"Calendars", Retrieved from <<https://web.archive.org/web/20140720164737/https://asana.com/guide/learn/projects/calendar>>, Retrieved Date: Aug. 19, 2014, 2 Pages.
"Calie—Calendar for iPhone and iPad", Retrieved from >>https://web.archive.org/web/20141113023804/http://www.blackburninternet.com/calie/index.php>>, Retrieved Date: Aug. 19, 2014, 5 Pages.
"DHTMLX JavaPlanner", Retrieved from <<http://web.archive.org/web/20130221042642/http//javaplanner.com/features.html>>, Retrieved Date: Feb. 21, 2013, 15 Pages.
"Events", Google Calendar API-Google evelopers, Retrieved on: Aug. 12, 2014, 8 Pages.
"Exelon Enbeded DVR", Retrieved from <<https://web.archive.org/web/20140820115626/http://austinsecurity.ca/downloads/custfiles/embedded/Exelon/Exelon%20Search%20and%20Archive.pdf>>, Retrieved Date: Aug. 18, 2014, 8 Pages.
"How to Make a Timeline Online With Yahoo!", Retrieved from<<https://web.archive.org/web/20100803015018/http://www.ehow.com/how_6719273_make-timeline-online-yahoo_html>>, Retrieved Date: Aug. 3, 2010, 3 Pages.
"Opera Dragonfly documentation", Retrieved from <<https://web.archive.org/web/20130201233852/http://www.opera.com/dragonfly/documentation/profiler/>>, Retrieved Date: Feb. 1, 2013, 3 Pages.
"Searching by Calendar or Timeline", Retrieved from <<https://www.safaribooksonline.com/library/view/david-pogues-digital/9780596156800/ch09s11.html>>, Retrieved Date: Aug. 18, 2014, 1 Page.
"Time Flow Analytical Timeline Visual Timelines for Investigation", Retrieved from https://web.archive.org/web/20101002044144/http://github.com/FlowingMedia/TimeFlow/wiki>>, Oct. 28, 2010, 2 Pages.
"Using ADF Timeline Components", Retrieved from <<https://web.archive.org/web/20131025010316/http://docs.oracle.com/cd/E28280_01/web.1111/b31973/dv_timeline.htm>>, Retrieved Date: Oct. 25, 2013, 17 Pages.
"WinForms Schedule Control Quick Start Guide", Retrieved from <<http://www.devcomponents.com/kb2/?p=404>>, Jul. 25, 2011, 32 Pages.
"Non-Final Office Action Issued in U.S. Appl. No. 14/518,425", dated Sep. 15, 2016, 30 Pages.
"Non-Final Office Action Issued in U.S. Appl. No. 14/518,515", dated Apr. 12, 2017, 32 Pages.
"Non-Final Office Action Issued in U.S. Appl. No. 14/518,824", dated Dec. 30, 2016, 24 Pages.

"Non-Final Office Action Issued in U.S. Appl. No. 14/520,293", dated Mar. 9, 2017, 20 Pages.
Byrne, et al., "Chapter 11-Searching Outlook Data", In Book Programming Applications for Microsoft Office Outlook, Feb. 28, 2007, 34 Pages.
Gear, Adeline, "ZenDay, an Efficient Time Management App with a 3D Interface", Retrieved from <<http://theapptimes.com/zenday-an-efficient-time-management-app-with-a-3d-interface/>>, May 24, 2013, 5 Pages.
Gkekas, et al., "A Smart Calendar Application for Mobile Environments", In Proceedings of the 3rd International conference on Mobile Multimedia Communications, Aug. 27, 2007, 5 Pages.
Jong, et al., "Timeline Documentation", Retrieved from <<http://almende.github.io/chap-links-library/js/timeline/doc/>>, Jul. 16, 2014, 15 Pages.
Liu, et al., "A Temporal Reasoning based Social Calendar Framework", In International Journal of Multimedia and Ubiquitous Engineering, vol. 9, Issue 5, Aug. 12, 2014, 8 Pages.
"International Search Report & Written Opinion Issued in PCT Application No. PCT/US2015/036561", dated Oct. 26, 2015, 9 Pages.
"International Preliminary Report on Patentability Issued in PCT Application No. PCT/US2015/036563", dated Oct. 6, 2016, 7 Pages.
"International Search Report & Written Opinion Received for PCT Patent Application No. PCT/US2015/036563", dated Sep. 11, 2015, 9 Pages.
"Second Written Opinion Issued in PCT Patent Application No. PCT/US2015/036563", dated Jun. 1, 2016, 6 Pages.
"International Search Report & Written Opinion Received for PCT Application No. PCT/US2015/036564", dated Sep. 11, 2015, 10 Pages.
"International Search Report & Written Opinion Issued in PCT Application No. PCT/US2015/036565", dated Sep. 21, 2015, 9 Pages.
"International Preliminary Report on Patentability Issued in PCT Application No. PCT/US2015/036568", dated Sep. 22, 2016, 7 Pages.
"International Search Report & Written Opinion Issued in PCT Application No. PCT/US2015/036568", dated Dec. 11, 2015, 10 Pages.
"Second Written Opinion Issued in PCT Application No. PCT/US2015/036568", dated May 17, 2016, 6 Pages.
"International Preliminary Report on Patentability Issued in PCT Application No. PCT/US2015/036570", dated Jul. 4, 2016, 6 Pages.
"International Search Report & Written Opinion Received for PCT Patent Application No. PCT/US2015/036570", dated Sep. 11, 2015, 9 Pages.
"Second Written Opinon Issued in PCT Patent Application No. PCT/US2015/036570", dated Apr. 11, 2016, 5 Pages.
"International Preliminary Report on Patentability Issued in PCT Application No. PCT/US2015/036571", dated Sep. 22, 2016, 7 Pages.
"International Search Report & Written Opinion Received for PCT Patent Application No. PCT/US2015/036571", dated Sep. 11, 2015, 9 Pages.
"Second Written Opinion Issued in PCT Application No. PCT/US2015/036571", dated May 17, 2016, 6 Pages.
Thayer, et al., "I LoveYou, Let's Share Calendars: Calendar Sharing as Relationship Work", In Proceedings of the ACM Conference on Computer Supported Cooperative Work, Feb. 11, 2012, pp. 749-758.
Valerie, "Wrike Adds Recurring Tasks Feature to All Accounts for Free", Retrieved from <<https://web.archive.org/web/20100106182058/http://www.wrike.com/blog/12116/2009/Wrike-Adds-Recurring-Tasks-Feature-to-All-Accounts-For-Free>>, Dec. 16, 2009, 3 Pages.
Vascellari, Andrea, "How to Use Google Calendar as a Project Management Tool", Retrieved from <<http://lifehacker.com/5918676/how-to-use-google-calendar-as-aproject-management-tool>>, Jun. 15, 2012, 7 Pages.

* cited by examiner

SHARE TIMELINE OF CALENDAR

RELATED APPLICATIONS

This applications claims the benefit of U.S. Provisional Patent Application Ser. No. 62/015,350 filed on Jun. 20, 2014. The disclosure of the provisional application is incorporated herein in its entirety.

BACKGROUND

Legacy calendar views in scheduling applications provide limited information. Alternatively, the legacy calendar views in scheduling applications provide excessive information. Legacy calendar views are usually used in detailed configurations for daily and weekly actions. However, users are underserved in long term synapsis of associated actions in legacy calendar views. Addition of actions and other items into legacy calendar views prove challenging for long term synapsis of associated actions.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to sharing a timeline of a calendar. In some example embodiments, a calendar application may detect an activation of a share operations control on the timeline of the calendar. A context menu may be displayed on the timeline, where the context menu includes a share control and a print control. An activation of the share control may be detected. A communication component may be initiated to share the timeline.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a timeline of a calendar may be shared by a calendar application. The calendar application may detect an activation of a share operations control on the timeline of the calendar. A context menu may be displayed on the timeline, where the context menu includes a share control and a print control. An activation of the share control may be detected. A communication component may be initiated to share the timeline.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable memory device includes a hardware device that includes a hard disk drive, a solid state drive, a compact disk, a memory chip, among others. The computer-readable storage medium can for example be implemented via one or more of a volatile computer memory, a non-volatile memory, a hard drive, and a flash drive.

Throughout this specification, the term "platform" may be a combination of software and hardware components to share a timeline of a calendar. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

Figure 1:
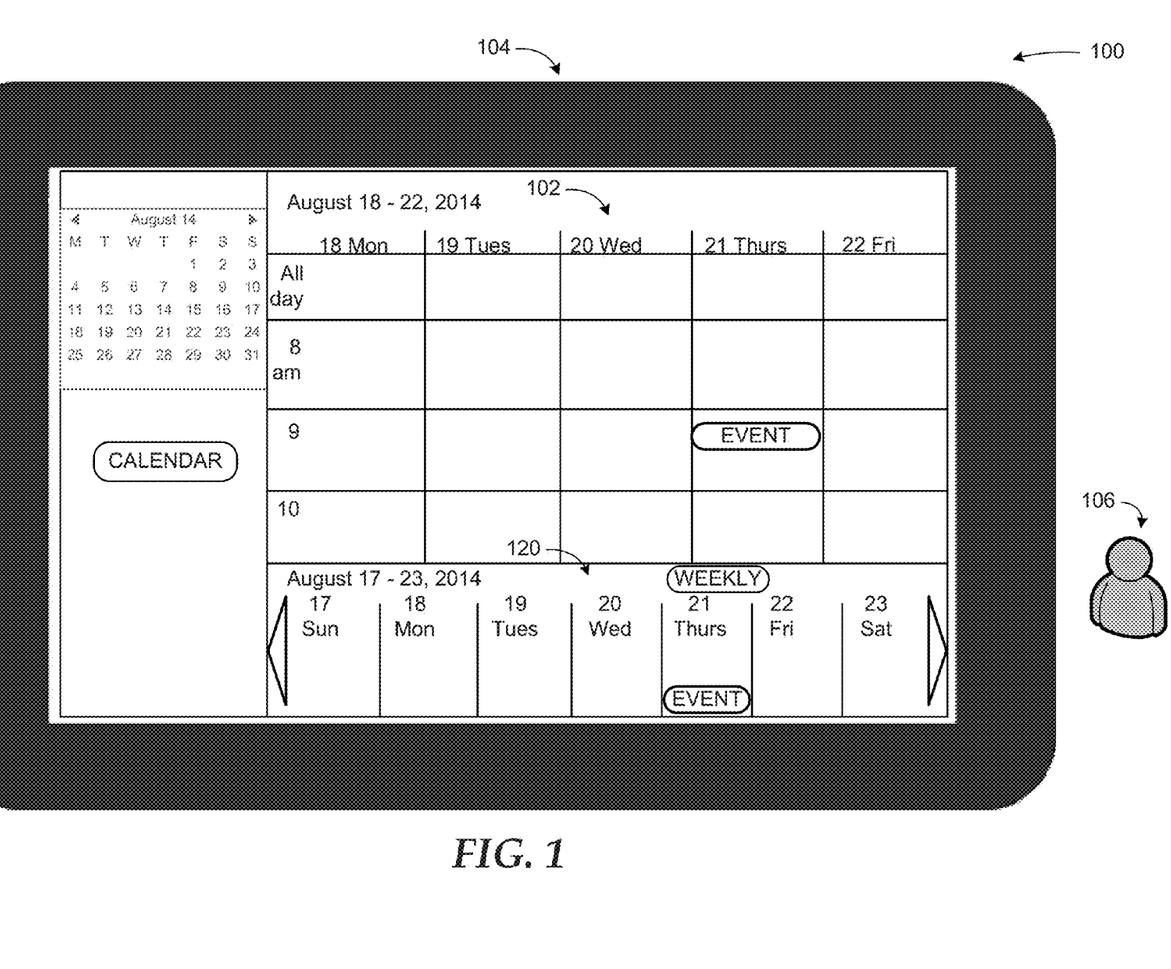
FIG. 1 is a conceptual diagram illustrating an example of sharing a timeline of a calendar, according to embodiments.

FIG. 1 is a conceptual diagram illustrating an example of sharing a timeline of a calendar, according to embodiments.

In a diagram 100, a computing device 104 may execute a calendar application 102. The computing device may include a tablet device, a laptop computer, a desktop computer, a smart phone, among others. The computing device 104 may display the calendar application 102 to a user 106. The user 106 may be allowed to interact with the calendar application 102 through an input device or touch enabled display component of the computing device 104. The user 106 may interact with the calendar application 102 with a keyboard based input, a mouse based input, a voice based input, a pen based input, a gesture based input, among others. The gesture based input may include one or more touch based actions such as a touch action, a swipe action, a combination of each, among others.

The calendar application 102 may include a timeline 120 as a component placed adjacent to and below a calendar. The timeline 120 may also be presented as a stand-alone component. The timeline 120 may include a linear presentation of events during a time period divided based on a time unit such as a day. Events presented on the timeline may be duplicates of the events on the calendar displayed by the calendar application 102. A user 106 may be allowed to interact with the calendar and the timeline 120 and share the timeline through a communication component such as an email messaging component. The timeline 120 may be captured as a snapshot and inserted into a message body of the communication component for transmission.

While the example system in FIG. 1 has been described with specific components including the computing device 104, the calendar application 102, the timeline 120, embodiments are not limited to these components or system configurations and can be implemented with other system configuration employing fewer or additional components.

Figure 2:
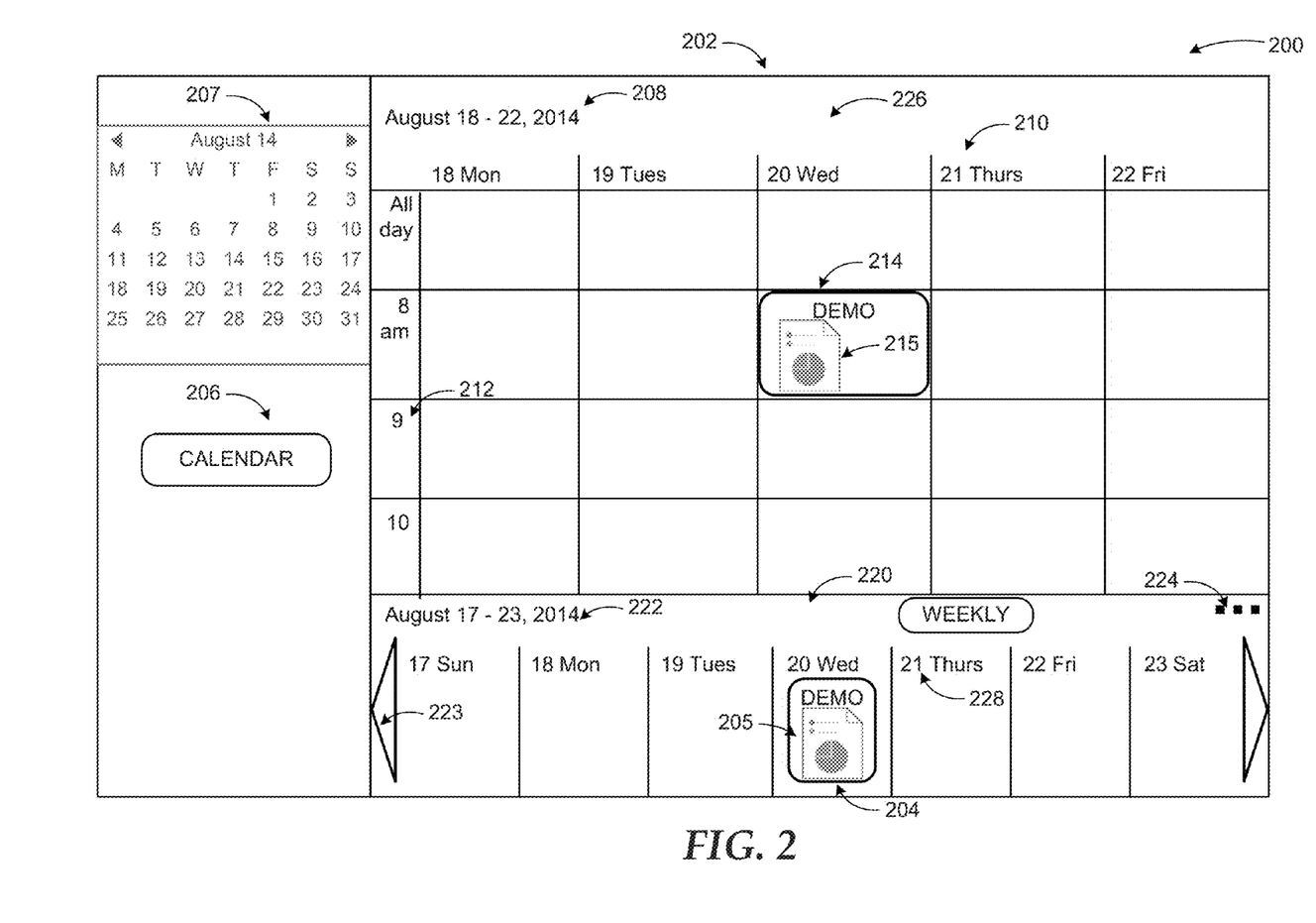
FIG. 2 illustrates an example of a calendar with a timeline that may be shared, according to embodiments.

FIG. 2 illustrates an example of a calendar with a timeline that may be shared, according to embodiments.

In a diagram 200, a calendar application 202 that displays a calendar 226 and a timeline 220 may be described. The timeline 220 of the calendar 226 may be shared with an entity such as a user, a service, an application, among others through a communication component of the calendar application 202. The calendar application 202 may provide one or more components to manage the calendar 226 and the timeline 220. A date picker component 207 may allow a user to select a date from a displayed range. The selected date may be displayed in the calendar 226 that shows the date within a date range that is configurable. The date range of the calendar 226 may include a day, a week, a month, a year, among others. A current date range may be illustrated with a date range label 208. The date range may also be partitioned vertically based on a time unit such as a day 210. The time units may be scrollable. The calendar 222 may also be partitioned horizontally based on an hour based unit 212. The hour based units may be scrollable. An "all day" unit may persist on a top section of the calendar 226 to show one or more events that last during a time unit such as a day.

The calendar 222 may also be selectable through a calendar selection control 206. The calendar application 202 may display one or more calendars that may be selectable through the calendar selection control 206 and other calendar selection controls displayed adjacent to the calendar selection control 206.

The timeline 220 may be displayed stand-alone or in conjunction with a calendar. The events displayed in the timeline 220 may be duplicates of events stored in the calendar 226. In addition, the timeline 220 may display a date range of events that may be scrollable through a scroll control 223. The date range may be presented with a date range label 222. The date range may be partitioned based on time units such as an hour, a day 228, a week, a month, a year, among others. The date range may be selectable based on a selection of the range by a user through a range selection control such as "weekly," among others.

The calendar application 202 may display an event 214 with a content 215 on the calendar 226. The content 215 may be stored in the event 214. Alternatively, the content 215 may be presented as a link on the event 214 to a local or external storage that stores the content 215. The content 215 may include an audio file, a video file, an image file, a document, among others. The event 214 may include attributes such as a subject, a summary, a duration, one or more dates, among others.

An event 204 may be displayed on the timeline 220 as a duplicate of the event 214 on the calendar. The event 204 may include a content 205 that is a duplicate of the content 215 of the event 214. Alternatively, the content 205 may be presented as a link to the content 215 of the event 214.

The timeline 220 may be shared with an authorized entity such as a user, a service, an application, among others through a communication component of the calendar application 202. The communication component may be launched through controls available in a share operations control 224. The share operations control may provide one or more controls that execute operations to share the timeline 220 or print the timeline 220. The timeline 220 may be captured as a snapshot in response to an activation of one of the controls available through the share operations control 224. The snapshot maybe stored as an image and embedded into a message body of the communication component. The message that includes the image of the timeline 220 may be transmitted to the authorized entity through the communication component of the calendar application 202.

Figure 3:
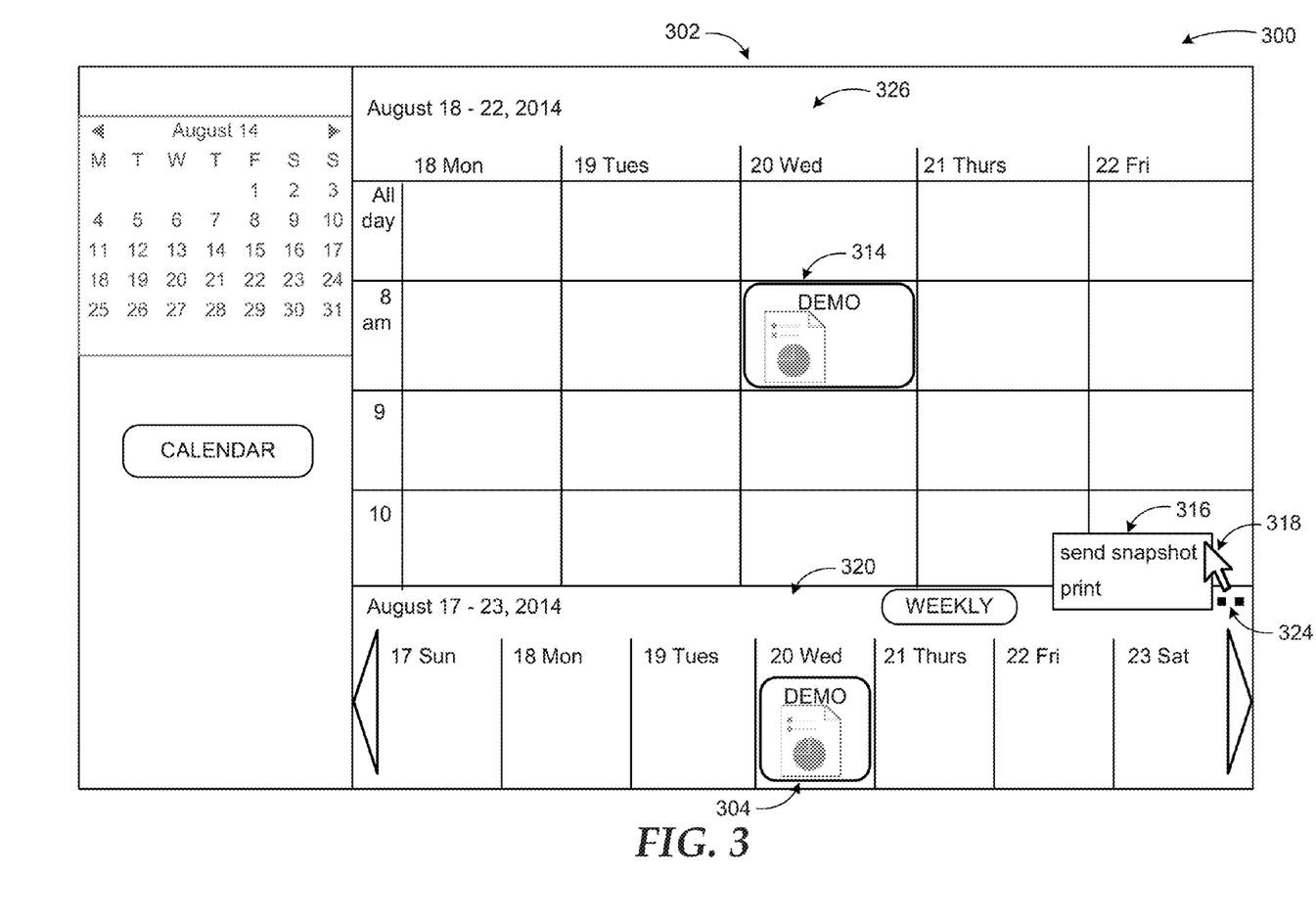
FIG. 3 illustrates an example of sharing a timeline of a calendar, according to embodiments.

FIG. 3 illustrates an example of sharing a timeline of a calendar, according to embodiments.

In a diagram 300, a calendar application 302 may display a timeline 320 of a calendar 326. The timeline 320 may include an event 304 that is a duplicate of an event 314 of the calendar 326. The event 304 may be placed on a date on the timeline 320 that corresponds to a date of the event 314 on the calendar 326. The event 314 of the calendar 326 and the event 304 of the timeline 320 may include content embedded within the events or stored as a link to a content stored at a data storage.

The calendar application 302 may display a share operations control 324 to provide additional controls that execute operations to share the timeline 320. The share operations control 324 may be displayed in a top right corner section of the timeline 320. In response to an activation of the share operations control 324, a context menu 316 may be displayed. The context menu may be displayed adjacent to the share operations control. The context menu 316 may include one or more controls to share the timeline 320. One of the controls may include a share control that may execute operations to share the timeline 320. The share control may initiate a communication component associated with the calendar application 302 to capture and transmit the timeline 320 to an entity that includes a user, an application, a service, among others, in response to an activation 318 of the share control.

Another control that may be provided by the context menu 316 may include a print control. In response to an activation, the print control may launch a print module associated with the calendar application 302. The print module may provide options to print the timeline 320 to a printer device or to a print file. The entity may be allowed to configure options associated with the print operations such as formatting of the timeline 320, among others. In response to an action to print the timeline 320, the timeline 320 may be printed on a print device or to a print file (such as a document) as displayed at a time of activation of the print operation.

Figure 4:
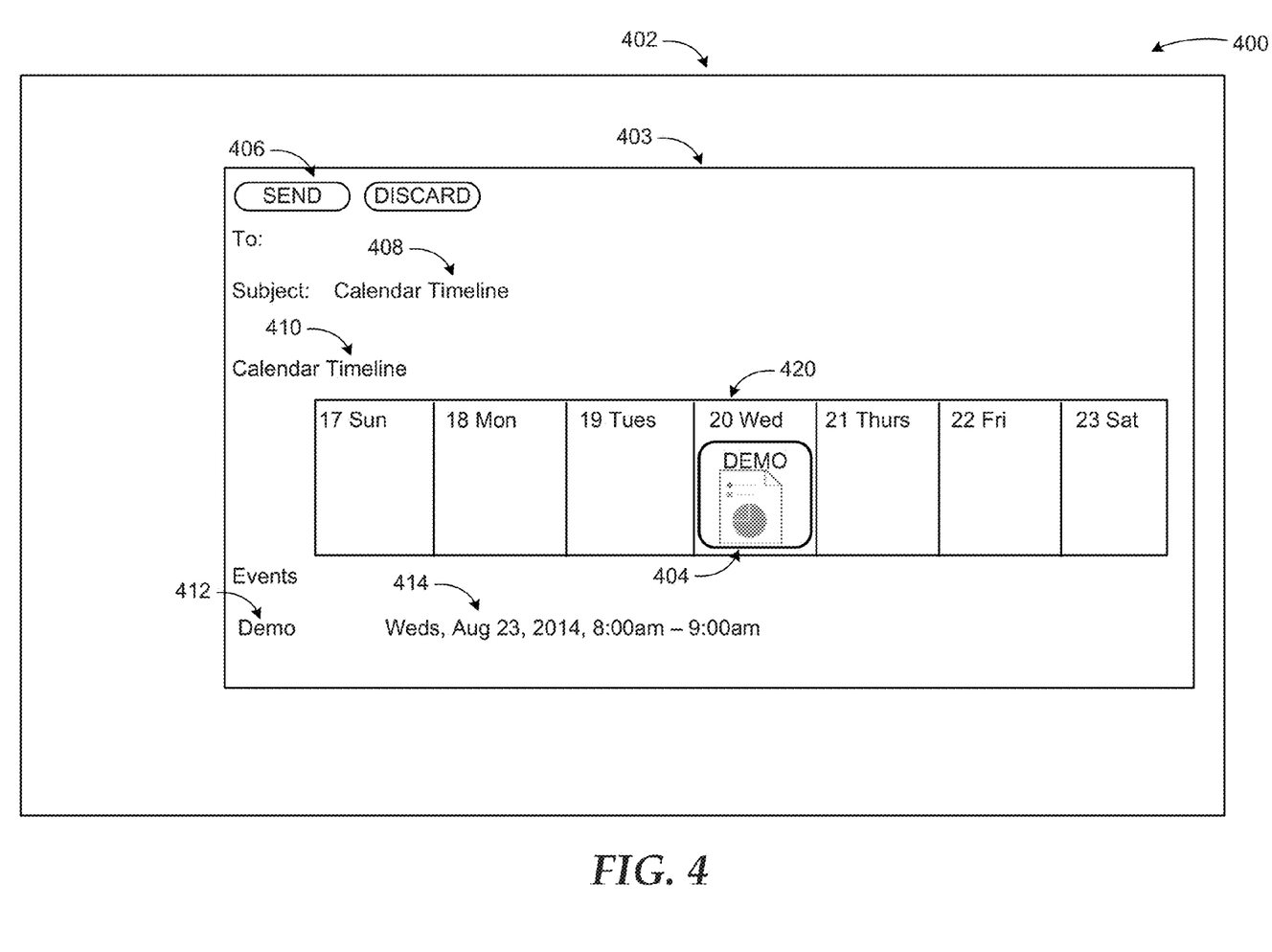
FIG. 4 illustrates an example of a communication component displayed to share a timeline of a calendar, according to embodiments.

FIG. 4 illustrates an example of communication component displayed to share a timeline of a calendar, according to embodiments.

In a diagram 400, a calendar application 402 may display a communication component 403 used to share a timeline of a calendar. The timeline may be captured in response to an activation of a share control on the timeline by an entity such as a user, an application, a service, among others that interact with the timeline. The timeline may be captured as a snapshot 420 at a time of an activation of the share control. The snapshot 420 may be captured as an image. The snapshot 420 may be inserted into a message body of the communication component 403. The message body may be a section of the communication component 403 that includes a text and graphics (editable) associated with a message to be sent to the entity.

The communication component 403 may include an email messaging component, a text messaging component, among others. The communication component 403 may be a component of the calendar application 402. Alternatively, the communication component 403 may be a component of an external application or an external service that may provide interfaces to allow the calendar application 402 to transmit messages to the entity. An external application or an external service may be authenticated through authorization schemes to protect privacy and data integrity.

The communication component 403 may provide controls 406 to transmit the message that includes the snapshot 420 of the timeline. The communication component 403 may provide headers that identify the message. A label 408 in the headers section of the communication component 403 may be auto-generated with attributes associated with the timeline and the calendar. The label 408 may be inserted into a subject field of the communication component. The label 408 may include a title of the calendar before a term "timeline." Another label 410 may be inserted into a top section of the message body of the communication component 403. The other label 410 may include a title of the calendar before a term "timeline."

The timeline may be inserted as the snapshot 420 into the message body of the communication component 403. The snapshot 420 may be inserted below the other label 410. The snapshot may be captured as an image that may be formatted in hyper markup text language (HTML). The HTML formatted image may be inserted into the message body. The snapshot 420 of the timeline may encompass an event 404 that may be displayed by the timeline at the time of capture. The image of the snapshot 420 may be scaled to fit a width of the communication component 403.

An entity such as a user may also be invited to share another timeline of the calendar. The other timeline may be associated with the calendar. The user may be provided with a permission to allow an add operation, a removal operation, a share content operation, among others in relation to events displayed on the timeline.

According to other examples, the event 404 may be detected on the timeline that was captured in the snapshot 420. An events section may be displayed on a message body of the communication component 403 that displays the event 404 (or other events on the timeline at the time of capture) below the snapshot 420. The events section may have a label "Events." The events section may display an event subject 412 of the event 404 on the timeline in a list format. A timestamp 414 may be displayed adjacent to the event subject 412 in the list format within the events section.

According to further examples, a selection action may be detected on the snapshot 420. The communication component 403 may be hidden to display the calendar and the timeline by the calendar application 402. A modification of the timeline may be detected. The modified timeline may be captured in a new snapshot. The snapshot 420 on the hidden communication component may be replaced with the new snapshot. The events section may also be replaced with events of the modified timeline. The communication component 403 may be redisplayed to allow for transmission of the modified timeline and the new events section.

The technical advantage of sharing a timeline of a calendar may be improved usability and enhanced reliability of display devices in a timeline of a calendar sharing, among other features compared to static event presentation based solutions.

The example scenarios and schemas in FIG. 1 through 4 are shown with specific components, data types, and configurations. Embodiments are not limited to systems according to these example configurations. Sharing a timeline of a calendar may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
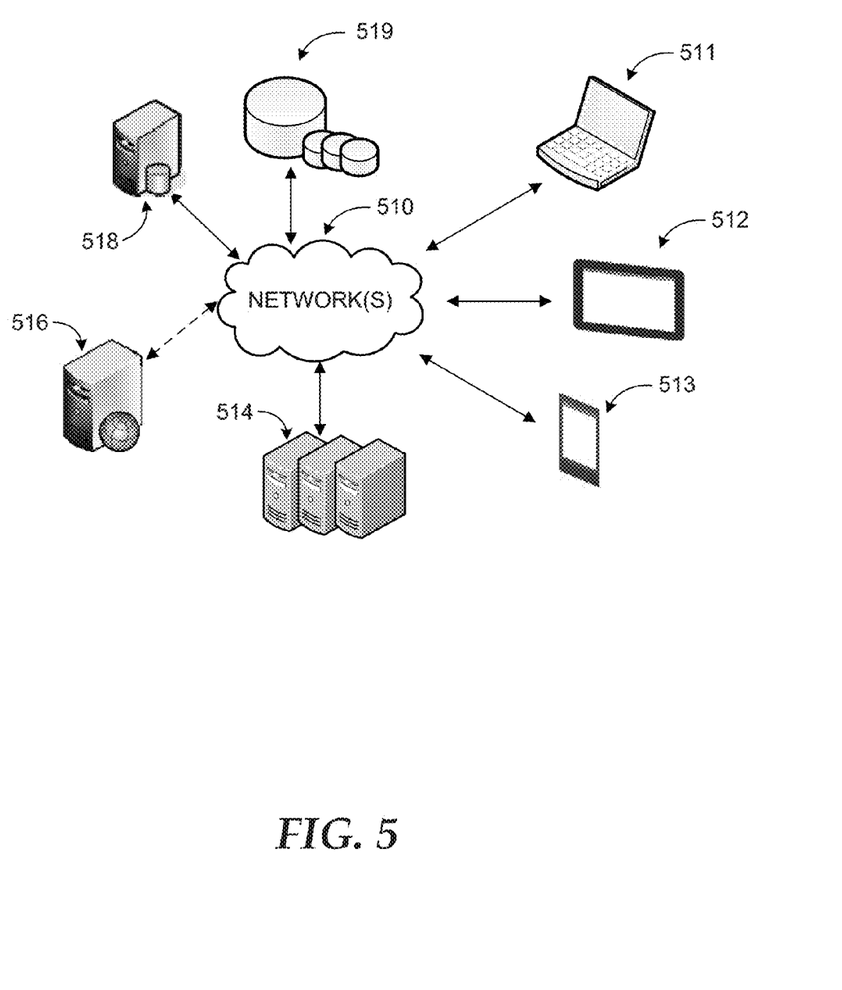
FIG. 5 is a simplified networked environment, where a system according to embodiments may be implemented.

FIG. 5 is an example networked environment, where embodiments may be implemented. A calendar application configured to share a timeline of a calendar may be implemented via software executed over one or more servers 514 such as a hosted service. The platform may communicate with client applications on individual computing devices such as a smart phone 513, a laptop computer 512, or desktop computer 511 ('client devices') through network(s) 510.

Client applications executed on any of the client devices 511-513 may facilitate communications via application(s) executed by servers 514, or on individual server 516. A calendar application may display a context menu that includes a share control and a print control on a timeline. A communication component to share the timeline may be initiated, in response to an activation of the share control. The calendar application may store data associated with the calendar and the timeline in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to share a timeline of a calendar. Furthermore, the networked environments discussed in FIG. 5 are for illustration purposes only. Embodiments are not limited to the example applications, modules, or processes.

Figure 6:
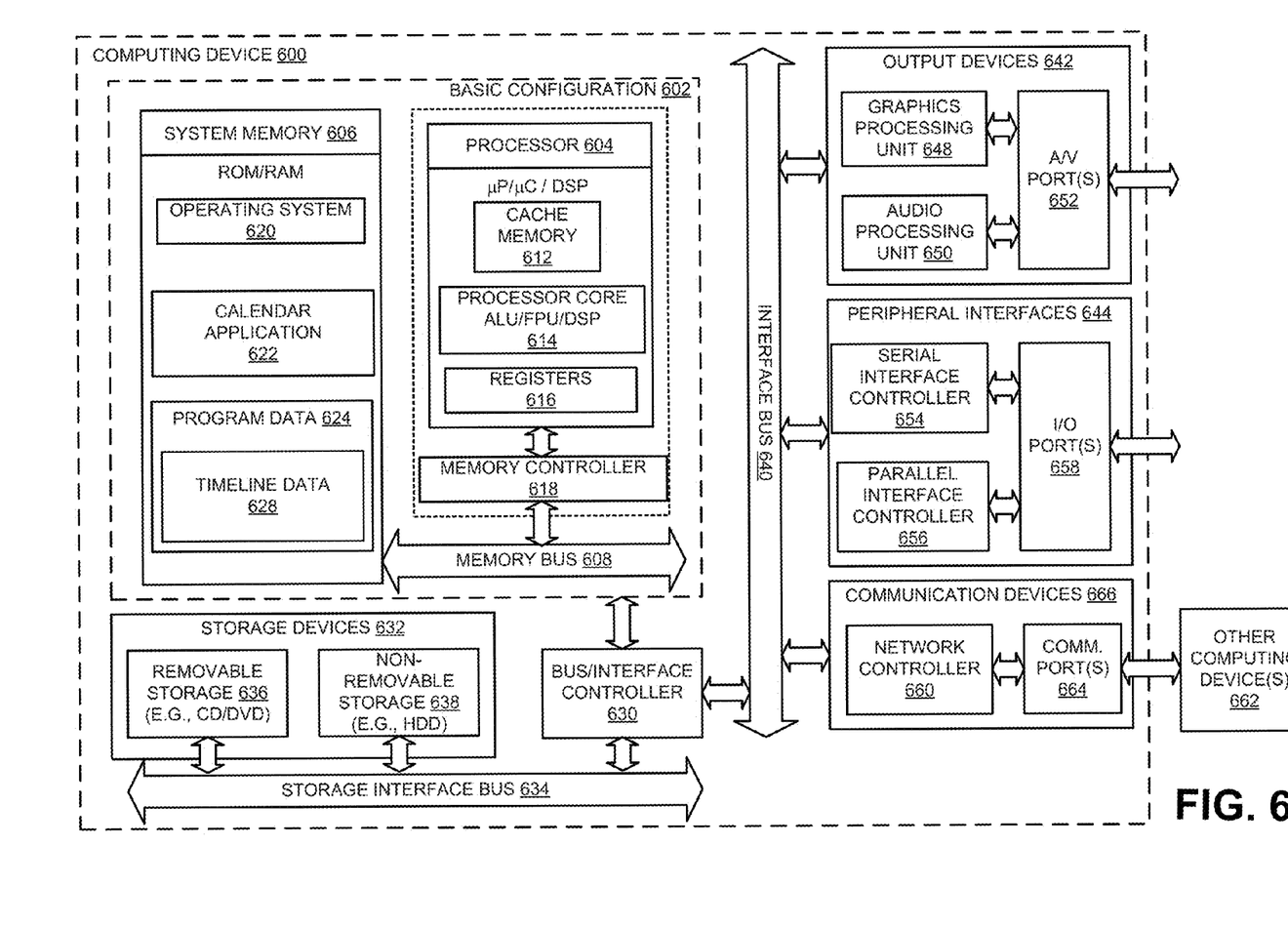
FIG. 6 illustrates a general purpose computing device, which may be configured to share a timeline of a calendar.

FIG. 6 illustrates a general purpose computing device, which may be configured to share a timeline of a calendar, arranged in accordance with at least some embodiments described herein.

For example, the computing device 600 may be used to share a timeline of a calendar. In an example of a basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including, but not limited to, a microprocessor (µP), a microcontroller (µC), a digital signal processor (DSP), or any combination thereof. The processor 604 may include one more levels of caching, such as a level cache memory 612, a processor core 614, and registers 616. The processor core 614 may include an arithmetic logic unit (ALU), a floating point unit (FPU), a digital signal processing core (DSP Core), or any combination thereof. A memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a calendar application 622, and a program data 624. The calendar application 622 may display a context menu that includes a share control and a print control on a timeline. A communication component to share the timeline may be initiated, in response to an activation of the share control. Components of the calendar application 622 (such as a user interface) may also be displayed on a display device associated with the computing device 600. An example of the display device may include a hardware screen that may be communicatively coupled to the computing device 600. The display device may include a touch based device that detects gestures such as a touch action. The display device may also provide feedback in response to detected gestures (or any other form of input) by transforming one or more user interfaces of the calendar application 622 such as the calendar and the timeline, displayed by the touch based device. The program data 624 may include, among other data, a timeline data 628, or the like, as described herein. The timeline data 628 may include a snapshot of the timeline, among others.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636, and the non-removable storage devices 638 may be examples of computer storage media. Computer storage media may include, but may not be limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 666) to the basic configuration 602 via the bus/interface controller 630. Some of the example output devices 642 may include a graphics processing unit 648 and an audio processing unit 650, which may be configured to communicate to various external devices, such as a display or speakers via one or more A/V ports 652. One or more example peripheral interfaces 644 may include a serial interface controller 654 or a parallel interface controller 656, which may be configured to communicate with external devices, such as input devices (for example, keyboard, mouse, pen, voice input device, touch input device, etc.) or other peripheral devices (for example, printer, scanner, etc.) via one or more I/O ports 658. An example communication device 666 may include a network controller 660, which may be arranged to facilitate communications with one or more other computing devices 662 over a network communication link via one or more communication ports 664. The one or more other computing devices 662 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include sharing a timeline of a calendar. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 7:
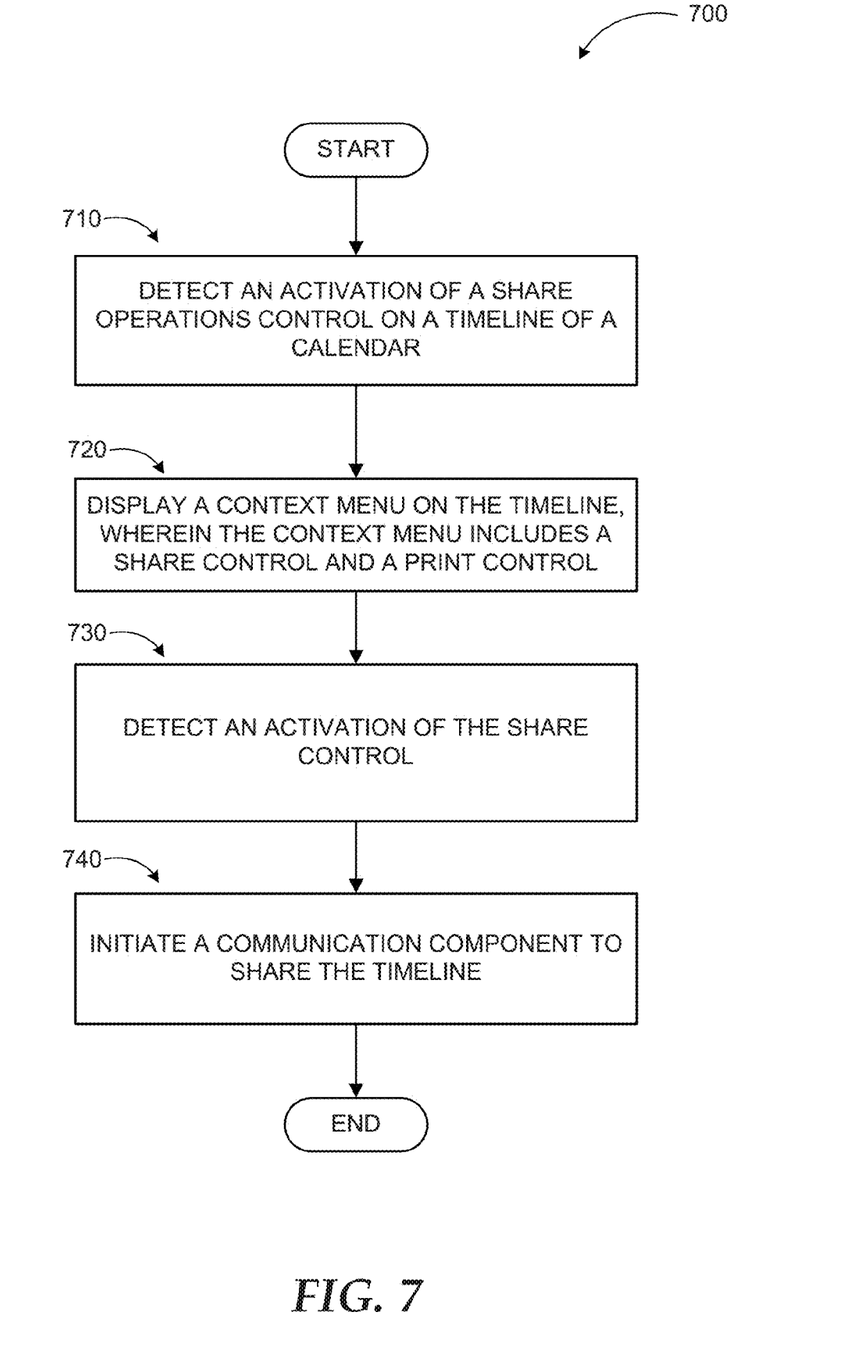
FIG. 7 illustrates a logic flow diagram for a process to share a timeline of a calendar, according to embodiments.

FIG. 7 illustrates a logic flow diagram for a process to share a timeline of a calendar, according to embodiments. Process 700 may be implemented on a calendar application.

Process 700 begins with operation 710, where an activation of a share operations control on a timeline of a calendar may be detected on the timeline. At operation 720, a context menu may be displayed on the timeline, where the context menu includes a share control and a print control. An activation of the share control may be detected at operation 730. At operation 740, a communication component may be initiated to share the timeline.

The operations included in process 700 are for illustration purposes. A calendar application according to embodiments may be implemented by similar processes with fewer or additional steps, as well as in different order of operations using the principles described herein.

According to some examples, a method that is executed on a computing device to share a timeline of a calendar may be described. The method may include detecting an activation of a share operations control on the timeline of the calendar, displaying a context menu on the timeline, where the context menu includes a share control and a print control, detecting an activation of the share control, and initiating a communication component to share the timeline.

According to other examples, the method may further include displaying the context menu adjacent to the share operations control. The communication component that includes one from a set of: an email messaging component and a text messaging component may be initiated. A label may be inserted into a subject field of the communication component, where the label includes a title of the calendar before a term "timeline." A label may be inserted into a top section of a message body on the communication component, where the label includes a title of the calendar before a term "timeline."

According to further examples, the method may further include capturing a snapshot of the timeline, inserting the snapshot into a message body on the communication component, and capturing the snapshot as an image of the timeline as displayed at the activation of the share control. The image may be formatted in hyper markup text language (HTML) and the HTML formatted image may be inserted into the message body as the snapshot. Dimensions of the image may be scaled to fit a width of the communication component. The method may further include inviting a user to share another timeline of the calendar, where the other timeline is associated with the user and providing the user a permission to allow one or more from a set of: an add operation, a removal operation, and a share content operation in relation to one or more events displayed on the timeline.

According to some examples, a computing device to share a timeline of a calendar may be described. The computing device may include a display device, a memory, a processor coupled to the memory and the display device. The processor may be configured to execute a calendar application in conjunction with instructions stored in the memory. The calendar application may be configured to detect an activation of a share operations control on the timeline of the calendar, display a context menu adjacent to the share operations control on the timeline, on the display device, where the context menu includes a share control and a print control, detect an activation of the share control, and initiate a communication component to share the timeline.

According to other examples, the calendar application is further configured to detect one or more events on the timeline, display an events section that includes the one or more events below a snapshot of the timeline on a message body of the communication component, on the display device, display event subjects of the one or more events in a list format within the events section, on the display device, and display event timestamps adjacent to the event subjects of the one or more events in the list format within the events section, on the display device. The calendar application is further configured to detect a selection of a snapshot of the timeline on a message body of the communication component, hide the communication component to display the calendar and the timeline, detect a modification to the timeline, capture the modified timeline as a new snapshot, replace the snapshot of the timeline with the new snapshot of the modified timeline on the message body of the communication component, and display the communication component, on the display device.

According to some examples, a computer-readable memory device with instructions stored thereon to share a timeline of a calendar may be described. The instructions may include actions that are similar to the method described above.

According to some examples, a means to share a timeline of a calendar may be described. The means to share a timeline of a calendar may include a means for detecting an activation of a share operations control on the timeline of the calendar, a means for displaying a context menu on the timeline, where the context menu includes a share control and a print control, a means for detecting an activation of the share control, and a means for initiating a communication component to share the timeline.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to share a timeline of a calendar, the method comprising;
    detecting an activation of a share operations control on the timeline of the calendar;
    capturing a snapshot of the timeline;
    displaying a context menu on the timeline, wherein the context menu includes a share control and a print control;
    detecting an activation of the share control;
    initiating a communication component to share the timeline by:
        inserting the snapshot into a body of a message on the communication component for transmission to and display on a display device; and automatically generating a header of the message based on attributes associated with the timeline and the calendar; and in response to detecting a modification to the timeline:
capturing a new snapshot of the modified timeline; and
replacing the snapshot of the timeline with the new snapshot of the modified timeline in the body of the message on the communication component for transmission to and display on the display device.

2. The method of claim 1, further comprising:
displaying the context menu adjacent to the share operations control.

3. The method of claim 1, further comprising:
initiating the communication component that includes one from a set of: an email messaging component and a text messaging component.

4. The method of claim 1, wherein automatically generating the header of the message based on attributes associated with the timeline and the calendar comprises:
inserting a label into a subject field of the communication component, wherein the label includes a title of the calendar before a term "timeline".

5. The method of claim 1, further comprising;
inserting a label into a top section of the body of the message on the communication component, wherein the label includes a title of the calendar before a term "timeline".

6. The method of claim 1, further comprising:
capturing the snapshot as an image of the timeline as displayed at the activation of the share control.

7. The method of claim 6, further comprising:
formatting the image in hyper markup text language (HTML); and
inserting the HTML formatted image into the body of the message as the snapshot.

8. The method of claim 6, further comprising:
scaling dimensions of the image to fit a width of the communication component.

9. The method of claim 1, further comprising:
inviting a user to share another timeline of the calendar, wherein the other timeline is associated with the user.

10. The method of claim 9, further comprising:
providing the user a permission to allow one or more from a set of: an add operation, a removal operation, and a share content operation in relation to one or more events displayed on the timeline.

11. A computing device to share a timeline of a calendar, the computing device comprising:
a display device;
a memory;
a processor coupled to the memory and the display device, the processor executing a calendar application in conjunction with instructions stored in the memory, wherein the calendar application is configured to:
detect an activation of a share operations control on the timeline of the calendar, wherein the timeline displays duplicated events from one or more events of the calendar and the duplicated events include one of: a content that is a duplicate of content from the one or more events of the calendar, and a link to the content from the one or more events of the calendar;
display a context menu adjacent to the share operations control on the timeline, on the display device, wherein the context menu includes a share control and a print control;
detect an activation of the share control;
initiate a communication component to share the timeline, wherein an events section comprising one or more of the duplicated events displayed within the timeline is positioned below the timeline and shared along with the timeline; and
in response to a detection of a modification to the timeline, replace the shared timeline with the modified timeline and the shared events section with a new events section comprising one or more other duplicated events displayed within the modified timeline.

12. The computing device of claim 11, wherein the calendar application is further configured to:
display event subjects of the one or more duplicated events in a list format within the events section, on the display device.

13. The computing device of claim 12, wherein the calendar application is further configured to:
display event timestamps adjacent to the event subjects of the one or more duplicated events in the list format within the events section, on the display device.

14. The computing device of claim 11, wherein the calendar application is further configured to:
detect a selection of a snapshot of the timeline on a message body of the communication component; and
hide the communication component to display the calendar and the timeline.

15. The computing device of claim 14, wherein the calendar application is further configured to:
capture the modified timeline as a new snapshot in response to the detection of the modification to the timeline;
replace the snapshot of the timeline with the new snapshot of the modified timeline on the message body of the communication component; and
display the communication component, on the display device.

16. A method executed on a computing device to share a timeline of a calendar, the method comprising:
detecting an activation of a share operations control on the timeline of the calendar, wherein the timeline displays duplicated events from one or more events of the calendar and the duplicated events include one of a content that is a duplicate of content from the one or more events of the calendar, and as link to the content from the one or more events of the calendar;
capturing a snapshot of the timeline, wherein one or more of the duplicated events are detected within the snapshot;
displaying a context menu adjacent to the share operations control on the timeline, wherein the context menu includes a share control and a print control;
detecting an activation of the share control;
initiating a communication component to share the timeline by:
inserting the snapshot and an events section comprising the one or more duplicated events detected within the snapshot into a body of a message on the communication component for transmission and display on a display device; and
automatically generating a header of the message based on attributes associated with the timeline and the calendar: and
in response to detecting a modification to the timeline:

capturing a new snapshot of the modified timeline, wherein one or more of the duplicated events are detected within the new snapshot of the modified timeline;

replacing the snapshot with the new snapshot on the message body of the communication component for transmission to and display on the display device; and replacing the events section comprising the one or more duplicated events detected within the snapshot with a new events section comprising the one or more duplicated events detected within the new snapshot on the message body of the communication component for transmission to and display on the display device.

17. The method of claim 16, further comprising:

capturing the snapshot of the timeline as an image of the timeline as displayed at the activation of the share control;

formatting the image in hyper markup text language (HTML); and inserting the HTML formatted image into the message body of the communication component.

18. The method of claim 16, further comprising:

inviting a user to share another timeline of the calendar, wherein the other timeline is associated with the user; and providing the user a permission to allow one or more from a set of: an add operation, a removal operation, and a share content operation in relation to one or more events displayed on the timeline.

\* \* \* \* \*